(12) United States Patent
Czapla et al.

(10) Patent No.: US 12,291,350 B2
(45) Date of Patent: May 6, 2025

(54) POWERPLANT FOR AN AIRCRAFT

(71) Applicant: Airbus Operations SAS, Toulouse (FR)

(72) Inventors: Lionel Czapla, Toulouse (FR);
Emmanuel Vardelle, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/456,586

(22) Filed: Aug. 28, 2023

(65) Prior Publication Data
US 2024/0067354 A1 Feb. 29, 2024

(30) Foreign Application Priority Data
Aug. 30, 2022 (FR) ...................................... 2208672

(51) Int. Cl.
| | |
|---|---|
| *B64D 37/32* | (2006.01) |
| *B64D 27/12* | (2006.01) |
| *B64D 37/04* | (2006.01) |
| *B64D 37/30* | (2006.01) |
| *F02C 3/22* | (2006.01) |
| *F02C 7/20* | (2006.01) |
| *F02C 7/22* | (2006.01) |

(52) U.S. Cl.
CPC ............. *B64D 37/30* (2013.01); *B64D 27/12* (2013.01); *B64D 37/04* (2013.01); *B64D 37/32* (2013.01); *F02C 3/22* (2013.01); *F02C 7/20* (2013.01); *F02C 7/222* (2013.01)

(58) Field of Classification Search
CPC ... B64D 2037/325; B64D 37/30; F02C 7/222; F02C 7/25
See application file for complete search history.

(56) References Cited

U.S. PATENT DOCUMENTS

| | | | | |
|---|---|---|---|---|
| 2,666,656 A | * | 1/1954 | Bruning ................... | F16L 37/23 |
| | | | | 137/614.04 |
| 2,952,125 A | * | 9/1960 | Brunton .................... | F02C 7/25 |
| | | | | 415/126 |

(Continued)

FOREIGN PATENT DOCUMENTS

| | | |
|---|---|---|
| DE | 2413507 A1 | 10/1975 |
| GB | 843359 A * | 8/1960 |
| GB | 1453873 A | 10/1976 |

OTHER PUBLICATIONS

French Search Report for corresponding French Patent Application No. 2208672 dated Mar. 17, 2023; priority document.

*Primary Examiner* — Todd E Manahan
*Assistant Examiner* — Marc Amar
(74) *Attorney, Agent, or Firm* — Greer, Burns & Crain, Ltd.

(57) ABSTRACT

A powerplant for an aircraft, comprising a frame, a propulsion system comprising a core enclosed in a casing and comprising a combustion chamber and a turbine, a supply pipe for conveying dihydrogen to the combustion chamber and that snakes outside the casing running along the turbine before dropping down into the combustion chamber through the casing, and a protective plate fastened to the frame and positioned between the casing and the supply pipe. With such an arrangement, if a blade of the turbine became detached it would meet the protective plate blocking its path to the dihydrogen pipe and would thus be diverted or stopped.

9 Claims, 5 Drawing Sheets (56) References Cited

U.S. PATENT DOCUMENTS

| | | | |
|---|---|---|---|
| 3,974,313 A | 8/1976 | James | |
| 4,474,346 A * | 10/1984 | Murphy | B64D 29/00 |
| | | | 60/797 |
| 4,818,176 A | 4/1989 | Huether et al. | |
| 5,458,343 A * | 10/1995 | Dornfeld | F01D 11/003 |
| | | | 277/606 |
| 2005/0025615 A1 | 2/2005 | Gabrys et al. | |
| 2008/0073460 A1 | 3/2008 | Beardsley et al. | |
| 2010/0101205 A1 | 4/2010 | Weyland et al. | |
| 2018/0044030 A1* | 2/2018 | Thies | F01D 9/065 |
| 2018/0283204 A1 | 10/2018 | Fracchia et al. | |
| 2020/0049279 A1* | 2/2020 | Chaudhari | F01D 11/003 |
| 2021/0078702 A1* | 3/2021 | Ciet | B64C 29/0033 |
| 2021/0310412 A1* | 10/2021 | Williams | F02C 7/20 |
| 2022/0250758 A1* | 8/2022 | Devendorf | B64D 29/02 |
| 2023/0043843 A1* | 2/2023 | Pissavin | B64D 37/04 |
| 2023/0167770 A1* | 6/2023 | Carretero Benignos | F02C 7/16 |
| | | | 60/39.091 |
| 2023/0339621 A1* | 10/2023 | Sarkar | F02C 3/22 |

* cited by examiner

POWERPLANT FOR AN AIRCRAFT

CROSS-REFERENCES TO RELATED APPLICATIONS

This application claims the benefit of the French patent application No. 2208672 filed on Aug. 30, 2022, the entire disclosures of which are incorporated herein by way of reference.

FIELD OF THE INVENTION

The present invention relates to a powerplant for an aircraft, the powerplant comprising a frame fastened to a structure of a wing of the aircraft, a single-flow propulsion system such as a turboprop engine, fastened to the frame, a dihydrogen pipe that supplies the combustion chamber of the propulsion system with the dihydrogen, and a protective plate fastened to the frame between the dihydrogen pipe and the turbine of the propulsion system. The invention also relates to an aircraft comprising at least one such powerplant.

BACKGROUND OF THE INVENTION

In order to move, an aircraft conventionally comprises at least one powerplant comprising a single-flow propulsion system such as a turboprop engine. Such a propulsion system comprises a core that is enclosed in a casing and comprises, inter alia, from upstream to downstream, a compressor, a combustion chamber and a turbine. As the case may be, the propulsion system also comprises a fan or a propeller rotated by the core. The compressor and the turbine each have blades that are fastened to a rotating shaft.

The powerplant also comprises a frame that is fastened to a structure of the wing of the aircraft and thus forms an attachment pylon under the wing.

In order to limit the pollution due to the use of kerosene, the use of dihydrogen as a fuel in the combustion chamber is envisaged.

This dihydrogen is conveyed from a tank to the combustion chamber by a dihydrogen pipe that extends at least partially in the powerplant. Due to the structure of the powerplant and its position under the wing and on the front of the wing, the dihydrogen pipe passes through the frame coming from the wing and thus runs from the back towards the front to the combustion chamber.

In order to limit the impact of the temperature of the core on the dihydrogen pipe, the pipe runs outside the casing and reaches the combustion chamber through the casing.

In the event of an incident on the propulsion system, some blades of the turbine or the compressor might detach from the shaft and, due to their speed, pass through the casing, potentially cutting the dihydrogen pipe.

SUMMARY OF THE INVENTION

One object of the present invention is to propose a powerplant that comprises protective means making it possible to protect a dihydrogen pipe passing in the vicinity of the blades of the turbine of the single-flow propulsion system.

To that end, a powerplant for an aircraft is proposed, comprising:
a frame,
a propulsion system fastened to the frame and comprising
a core enclosed in a casing and comprising a combustion chamber and a turbine provided with blades rotating about a longitudinal axis,
a supply pipe for conveying dihydrogen to the combustion chamber, in which the supply pipe snakes outside the casing running along the turbine before dropping down into the combustion chamber through the casing, and
a protective plate fastened to the frame by fastening means and positioned between the casing and the supply pipe and between the supply pipe and the turbine, the powerplant being characterized in that the fastening means comprise a front fastening system arranged at a front part of the protective plate and two lateral fastening systems positioned on either side of a vertical mid-plane of the protective plate behind the front part, where the front fastening system comprises a front rod hingedly fastened by a first connection point to the frame at the mid-plane of the protective plate and by two second connection points to the protective plate, where the second connection points are positioned on either side of the mid-plane of the protective plate, and each lateral fastening system comprises a lateral rod hingedly fastened by a first connection point to the frame and by two second connection points to the protective plate.

With such an arrangement, if a blade of the turbine became detached it would meet the protective plate blocking its path to the dihydrogen pipe and would thus be diverted or stopped.

Advantageously, a front end of the protective plate is positioned, perpendicular to the longitudinal axis, at least at the foremost blades of the turbine, and the rear end of the protective plate is positioned, perpendicular to the longitudinal axis, at least at the rearmost blades of the turbine.

Advantageously, the protective plate extends in front of the foremost blades of the turbine and behind the rearmost blades of the turbine.

According to one particular embodiment, viewed from the front, the turbine rotates in a clockwise direction, the supply pipe is positioned on the starboard side relative to a mid-plane of the propulsion system and above the casing, and the protective plate extends on the starboard side horizontally over generally half of the width of the frame.

According to one particular embodiment, the protective plate extends horizontally over the width of the frame and it has a V-shaped crease the point of which is oriented towards the longitudinal axis and in which the supply pipe is positioned in the vicinity of the opening of the V-shaped crease.

According to one particular embodiment, the protective plate extends horizontally over the width of the frame and has ribs parallel to the longitudinal axis.

According to one particular embodiment, the protective plate takes the form of a corrugated plate.

According to one particular embodiment, the protective plate takes the form of a V-shaped section the point of which is oriented towards the longitudinal axis and in which the supply pipe is positioned inside the opening of the V.

The invention also proposes an aircraft comprising a wing, a dihydrogen tank and at least one powerplant according to one of the preceding variants, in which the frame is fastened to the wing and in which the supply pipe is fluidly connected to the dihydrogen tank.

BRIEF DESCRIPTION OF THE DRAWINGS

The aforementioned features of the invention, and others, will become more clearly apparent on reading the following description of one exemplary embodiment, the description being given with reference to the appended drawings, in which.

DETAILED DESCRIPTION OF THE PREFERRED EMBODIMENTS

Figure 1:
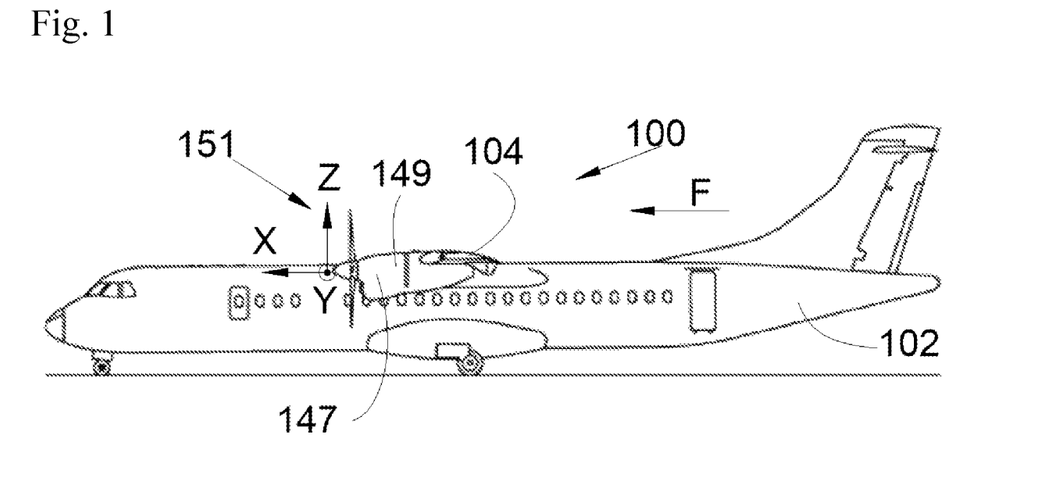
FIG. 1 is a side view of an aircraft comprising a powerplant according to the invention.

In the following description, terms relating to position are given with reference to an aircraft in a position of forward travel, i.e., as shown in FIG. 1, in which the arrow F shows the direction of forward travel of the aircraft.

In the following description, as is conventional, the longitudinal axis of the propulsion system, which is parallel to the longitudinal axis of the aircraft positively oriented towards the front in the direction of forward travel of the aircraft, is referred to as X, the transverse axis, which is horizontal when the aircraft is on the ground, is referred to as Y, and the vertical axis or vertical height when the aircraft is on the ground is referred to as Z, these three axes X, Y and Z being orthogonal to each other.

FIG. 1 shows an aircraft 100 that has a fuselage 102 on either side of which is fastened a wing 104. Under each wing 104 is fastened at least one powerplant 151 comprising a nacelle 149 comprising cowls 147 forming an aerodynamic outer surface.

Figure 2:
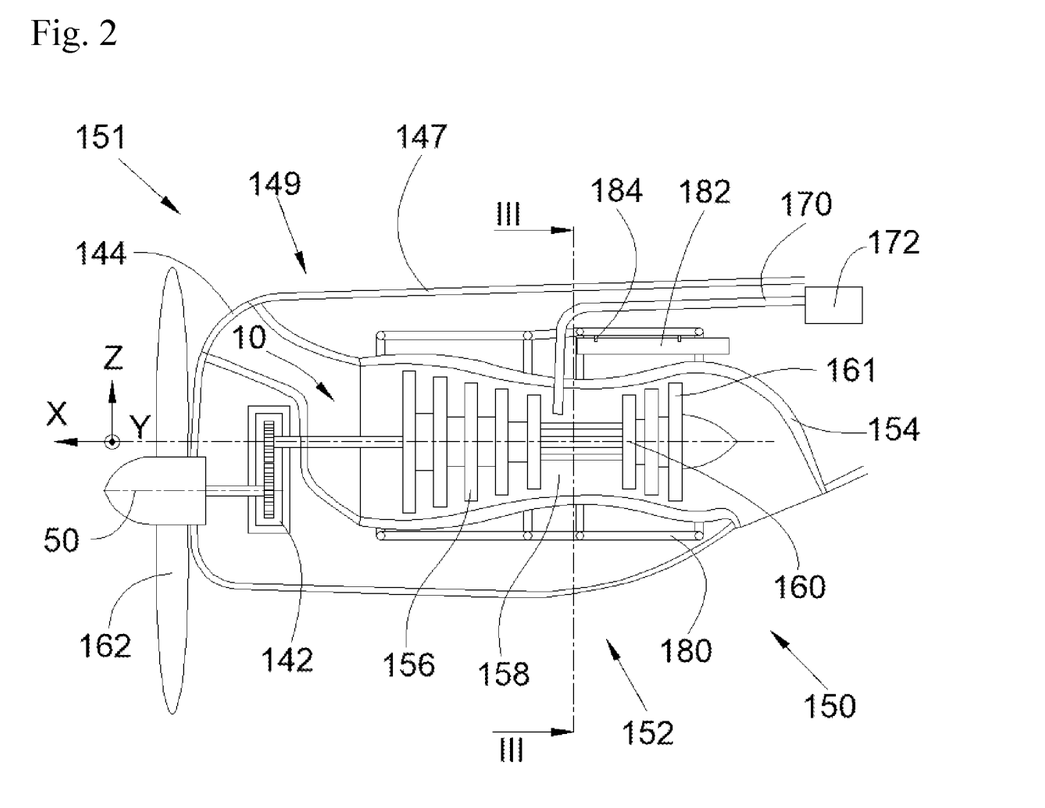
FIG. 2 is a schematic cross-sectional side view of a propulsion system of the powerplant according to the invention.

FIG. 2 shows the powerplant 151, which also comprises a propulsion system 150 that is shown schematically. The powerplant 151 comprises a frame 180 that fastens the powerplant 151 to a structure of the wing 104 and forms an attachment pylon. In the embodiment of the invention shown in FIG. 2, the frame 180 takes the form of a cage comprising, inter alia, beams fastened to each other. The frame 180 is fastened to the structure of the wing by fastening means known to a person skilled in the art.

In the embodiment of the invention shown in FIG. 2, the propulsion system 150 is a turboprop engine that comprises a core 152 enclosed in a casing 154. In the embodiment of the invention shown in FIG. 2, the casing 154 is housed inside the frame 180 forming a cage and is fastened thereto by any appropriate means known to a person skilled in the art.

Outside air enters the nacelle 149 through an opening 144 provided in the cowls 147 at the front of the nacelle 149.

Inside the nacelle 149, the primary air flow 10 enters the core 152 to supply the combustion chamber 158 with dioxygen.

The casing 154 is thus open at the front to allow the introduction of the primary flow 10 into the core 152 and open at the rear to allow the gases produced by combustion to be exhausted through a nozzle. The core 152 comprises, from upstream to downstream, a compressor 156, a combustion chamber 158 and a turbine 160. The compressor 156 and the turbine 160 are provided with blades 161 rotating about the longitudinal axis X.

The primary flow 10 thus passes in succession through the compressor 156 where it is compressed before being injected into the combustion chamber 158 where it is mixed with the fuel. The gases produced by combustion then pass through the turbine 160 and rotate it. The turbine 160 in turn rotates the compressor 156 and the gases are then discharged at the rear.

In the case of a turboprop engine, the propulsion system 150 comprises a propeller 162 that is at the front and rotated by the turbine 160. In the embodiment of the invention disclosed here, the propulsion system 150 also comprises a gearbox 142 mounted between the turbine 160 and the propeller 162 that rotates about an axis of rotation 50 parallel to the longitudinal axis X and is offset here relative to the longitudinal axis X.

Generally, the object of the invention is applied to a propulsion system 150 with a primary flow 10 inside the core 152.

The powerplant 151 also comprises a supply pipe 170 that makes it possible to convey dihydrogen as a fuel to the combustion chamber 158, being fluidly connected to a dihydrogen tank 172 of the aircraft 100. The supply pipe 170 thus snakes from the rear of the nacelle 149 outside the housing 154, thus running along and outside of the turbine 160 before dropping down into the combustion chamber 158 through the casing 154.

In the event of an incident on the propulsion system 150, the blades 161 of the turbine 160 might become detached and pass through the casing 154. In order to protect the supply pipe 170, the powerplant 151 comprises a protective plate 182 that is fastened to the frame 180 by fastening means 184 and is positioned between the casing 154 and the supply pipe 170 and between the supply pipe 170 and the turbine 160.

The front end of the protective plate 182 is positioned, perpendicular to the longitudinal axis X, at least at the level of the foremost blades 161 of the turbine 160, and the rear end of the protective plate 182 is positioned, perpendicular to the longitudinal axis X, at least at the level of the rearmost blades 161 of the turbine 160.

If a blade 161 of the turbine 160 became detached, the blade 161 would thus collide with the protective plate 182 and its path would be interrupted or diverted before it reached the supply pipe 170.

In the event of detachment, a blade 161 of the turbine 160 can depart radially relative to the longitudinal axis X, but there can be a degree of scattering and it can depart forwards or backwards. It is thus preferable to extend the protective plate 182 beyond the blades 161 of the turbine 160 to take into account the risk of scattering. It is thus preferable that the protective plate 182 extends in front of the foremost blades 161 of the turbine 160 and behind the rearmost blades 161 of the turbine 160.

Due to the position of the supply pipe 170, which is at the rear relative to the combustion chamber 158, the supply pipe 170 never runs along the compressor 156 and it is not therefore necessary to put in place a protective plate. Of course, if in another configuration the supply pipe 170 runs along the compressor 156, a similar protective plate can be put in place.

Due to the footprint at the bottom of the frame 180 in which the casing 154 is housed, the supply pipe 170 preferably extends at the top of the frame 180 and therefore above the casing 154.

The protective plate 182 is, for example, made from a titanium alloy with high specific strength such as the alloy known as Ti-6Al-4V and has for example a thickness of the order of 30 mm.

Figure 3:
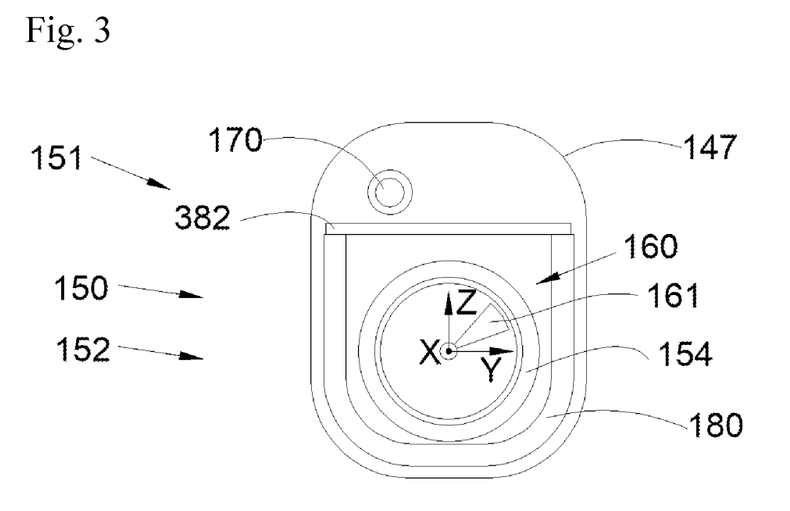
FIG. 3 is a schematic cross-sectional view along the line III-III of a powerplant according to a first variant embodiment of the invention.
Figure 4:
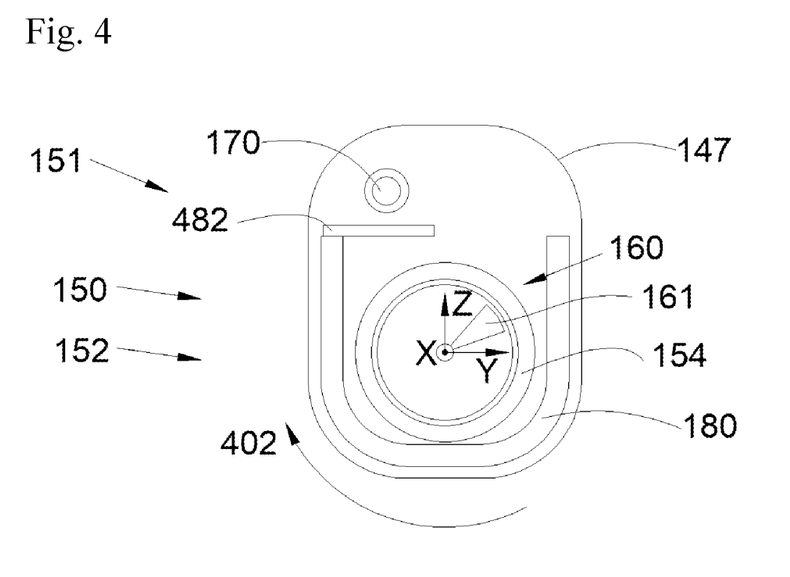
FIG. 4 is a similar view to FIG. 3, for a powerplant according to a second variant embodiment of the invention.

FIG. 3 shows a first variant of the invention in which the protective plate 382 extends parallel to the horizontal plane XY over the width of the frame 180. FIG. 4 shows a second variant of the invention in which, viewed from the front, the turbine 160 rotates in a clockwise direction (arrow 402), the supply pipe 170 is positioned on the starboard side relative to a mid-plane XZ of the propulsion system 150 and above the casing 154, and in which the protective plate 482 extends on the starboard side parallel to the horizontal plane XY over generally half of the width of the frame 180. Such an assembly makes it possible make weight savings and, due to the direction of rotation, only the blades 161 rising on the starboard side are liable to strike the supply pipe 170.

Figure 5:
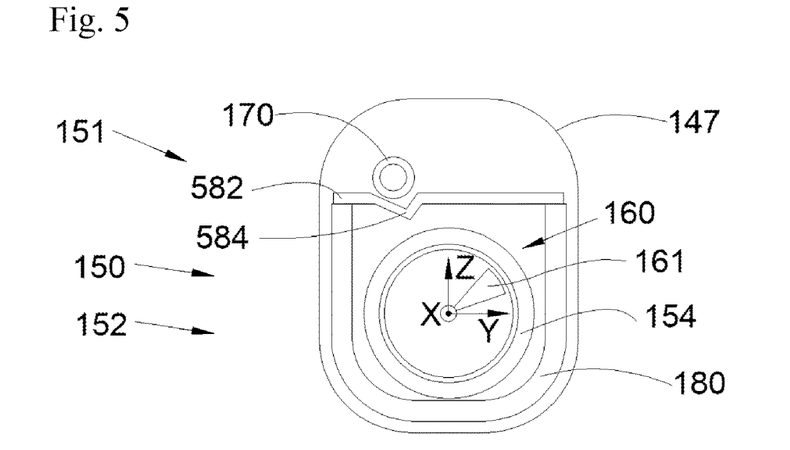
FIG. 5 is a similar view to FIG. 3, for a powerplant according to a third variant embodiment of the invention.

FIG. 5 shows a third variant in which the protective plate 582 extends parallel to the horizontal plane XY over the width of the frame 180 and has a V-shaped crease 584 the point of which is oriented here towards the longitudinal axis X and in which the supply pipe 170 is positioned in the vicinity of the opening of the V-shaped crease 584.

Figure 6:
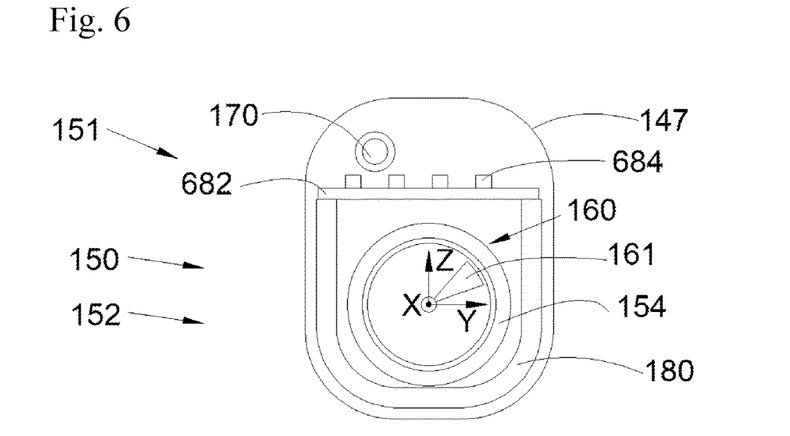
FIG. 6 is a similar view to FIG. 3, for a powerplant according to a fourth variant embodiment of the invention.

FIG. 6 shows a fourth variant in which the protective plate 682 extends parallel to the horizontal plane XY over the width of the frame 180 and has ribs 684 parallel to the longitudinal axis X.

Figure 7:
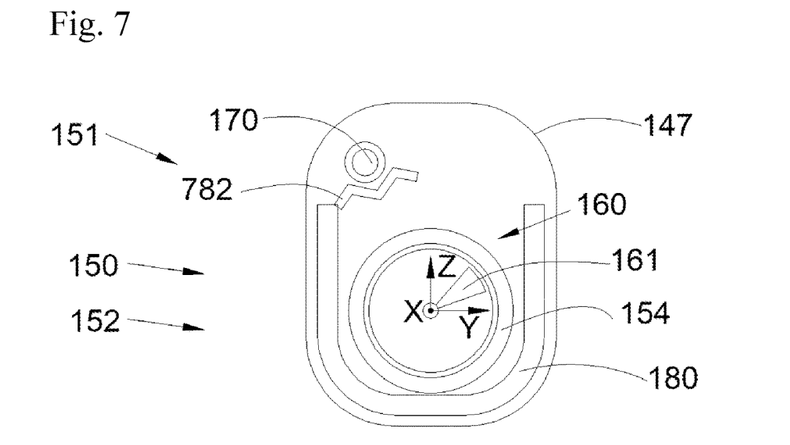
FIG. 7 is a similar view to FIG. 3, for a powerplant according to a fifth variant embodiment of the invention.

FIG. 7 shows a fifth variant in which the protective plate 782 takes the form of a corrugated plate that extends here over generally half of the width of the frame 180 but could extend over the entire width of the frame 180.

Figure 8:
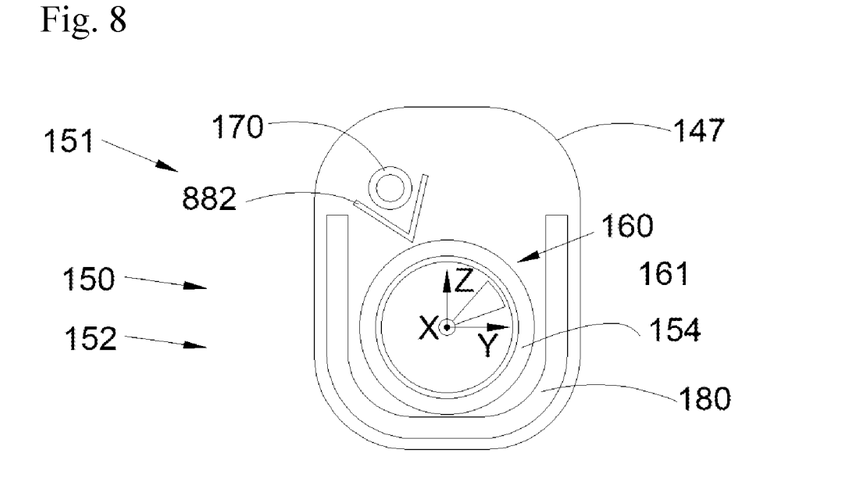
FIG. 8 is a similar view to FIG. 3, for a powerplant according to a sixth variant embodiment of the invention.

FIG. 8 shows a sixth variant in which the protective plate 882 takes the form of a V-shaped section the point of which is oriented towards the longitudinal axis X and in which the supply pipe 170 is positioned inside the opening of the V.

The fastening means 184 can for example be clamping screws, rivets, etc., that fasten the protective plate 182 to the frame 180.

Figure 9:
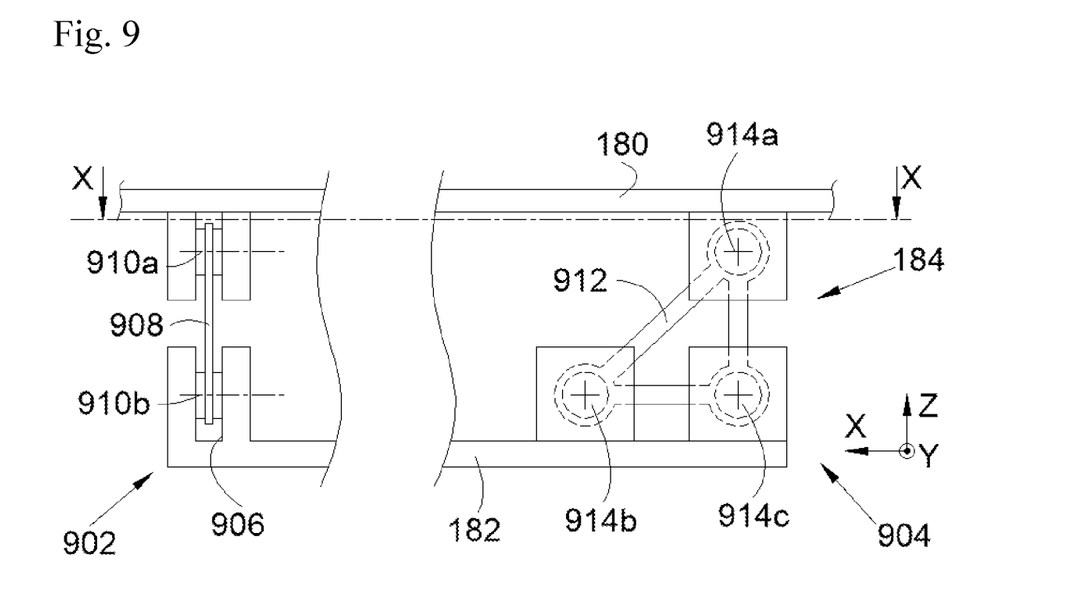
FIG. 9 is a side view of the protective plate according to a particular embodiment.
Figure 10:
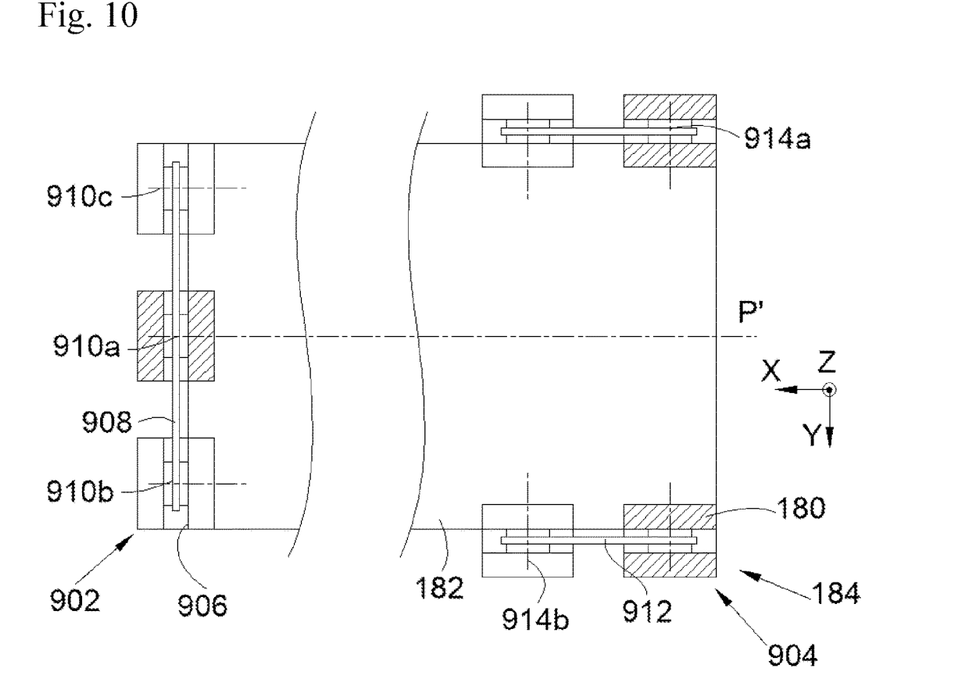
FIG. 10 is a cross-sectional view along the line X-X in FIG. 9 of the protective plate.

FIGS. 9 and 10 shows a particular embodiment of the fastening means 184 that fasten the protective plate 182 to the frame 180 if the protective plate 182 is positioned horizontally.

Here, the protective plate 182 is suspended beneath two elements of the frame 180, such as beams parallel to the longitudinal axis X.

The fastening means 184 comprise a front fastening system 902 and two lateral fastening systems 904. The front fastening system 902 is arranged at the level of a front part 906 of the protective plate 182 and the lateral fastening systems 904 are positioned on either side of a vertical mid-plane P' of the protective plate 182 and parallel to the longitudinal axis X and behind the front part 906.

The front fastening system 902 comprises a front rod 908 hingedly fastened by a first connection point 910a to the frame 180 at the level of the mid-plane P' and by two second connection points 910b-c to the protective plate 182, in which the second connection points 910b-c are positioned on either side of the mid-plane P'. The first connection point 910a is above the second connection points 910b-c.

The front rod 908 is contained in a plane perpendicular to the longitudinal axis X.

Each lateral fastening system 904 comprises a lateral rod 912 hingedly fastened by a first connection point 914a to the frame 180 and by two second connection points 914b-c to the protective plate 182, in which the three connection points 914a-c of each lateral fastening system 904 are positioned in a plane parallel to the mid-plane P'. The first connection point 914a is above the second connection points 914b-c.

Each connection point produces at least one pivot connection, the axes of the connection points 910a-c of the front fastening system 902 are parallel to the longitudinal axis X and the axes of the connection points 914a-c of each lateral fastening system 904 are parallel to the transverse axis Y.

Figure 11:
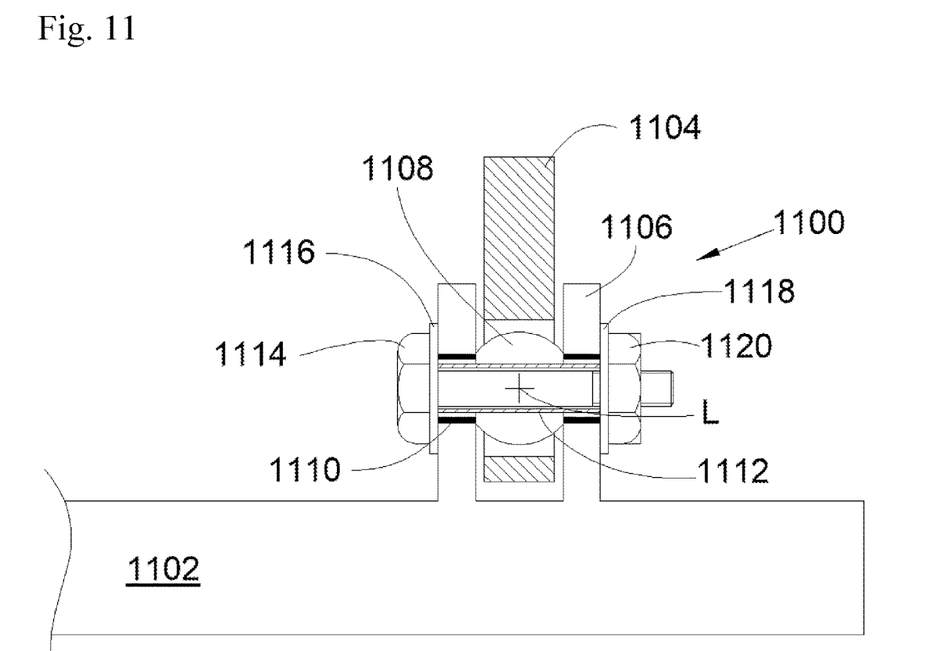
FIG. 11 is a view of a detail of fastening means.

Preferably however, each connection point produces a ball joint connection, an embodiment of which is shown in FIG. 11.

FIG. 11 shows a detail of each connection point 1100 between a first element 1102 and a second element 1104. The first element 1102 can be the frame 180 or the protective plate 182 and the second element 1104 is a rod 908, 912.

The first element 1102 comprises a clevis with two arms 1106 between which is arranged a swivel bearing 1108 rigidly connected to the second element 1104. Each arm is pierced by a bore in which is inserted an end sleeve 1110. A hinge pin 1112 that takes the form of a hollow cylindrical stem is slidably fitted into each of the end sleeves 1110 and force fitted into a bore made in the swivel bearing 1108 in order to make it possible for the swivel bearing 1108 to pivot relative to the clevis about a connection axis L.

On one side of the clevis, a screw 1114 is inserted into the hinge pin 1112 and a first flat lock washer 1116 is fitted onto the shank of the screw 1114 and interposed between the head of the screw 1114 and an end sleeve 1110, and on the other side of the clevis, a second flat lock washer 1118 is fitted onto the shank of the screw 1114 and interposed between the other end sleeve 1110 and a threaded end of the screw, where a clamp nut 1120 is tightened to the desired torque on the threaded end of the screw 1114 to come up against the second flat lock washer 1118 and hold the washers 1116 and 1118 pressed against the end sleeves 1110.

The assembly of the two elements together is finalized by the axial immobilization, along the connection axis L, of the end sleeves 1110 and the swivel bearing 1108. This immobilization is achieved due to the compaction between the clamp nut 1120 in contact with the second lock washer 1118 and the head of the screw 1114 in contact with the first lock washer 1116.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A powerplant for an aircraft comprising:
a frame, a propulsion system fastened to the frame and comprising a core enclosed in a casing and comprising a combustion chamber and a turbine provided with blades rotating about a longitudinal axis, a supply pipe for conveying dihydrogen to the combustion chamber, in which the supply pipe snakes outside the casing running along the turbine before dropping down into the combustion chamber through the casing, and a protective plate fastened to the frame by fastening means and positioned between the casing and the supply pipe and between the supply pipe and the turbine, the powerplant, wherein the fastening means comprise a front fastening system arranged at a front part of the protective plate and two lateral fastening systems positioned on either side of a vertical mid-plane of the protective plate behind the front part, where the front fastening system comprises a front rod hingedly fastened by a first connection point to the frame at the mid-plane of the protective plate and by two second connection points to the protective plate, in which the second connection points are positioned on either side of the mid-plane of the protective plate, and wherein each lateral fastening system comprises a lateral rod hingedly fastened by a first connection point to the frame and by two second connection points to the protective plate.

2. The powerplant according to claim 1, wherein a front end of the protective plate is positioned, perpendicular to the longitudinal axis, at least at foremost blades of the turbine, and a rear end of the protective plate is positioned, perpendicular to the longitudinal axis, at least at rearmost blades of the turbine.

3. The powerplant according to claim 2, wherein the protective plate extends in front of the foremost blades of the turbine and behind the rearmost blades of the turbine.

4. The powerplant according to claim 1,
wherein, viewed from the front, the turbine rotates in a clockwise direction,
wherein the supply pipe is positioned on the starboard side relative to a mid-plane of the propulsion system and above the casing, and
wherein the protective plate extends on the starboard side horizontally over generally half of a width of the frame.

5. The powerplant according to claim 1,
wherein the protective plate extends horizontally over a width of the frame and has a V-shaped crease, a point of which is oriented towards the longitudinal axis, and
wherein the supply pipe is positioned in a vicinity of the opening of the V-shaped crease.

6. The powerplant according to claim 1,
wherein the protective plate extends horizontally over a width of the frame and
wherein the protective plate has ribs parallel to the longitudinal axis.

7. The powerplant according to claim 1, wherein the protective plate is formed of a corrugated plate.

8. The powerplant according to claim 1,
wherein the protective plate is formed as a V-shaped section, a point of which is oriented towards the longitudinal axis, and
wherein the supply pipe is positioned inside the opening of said V.

9. An aircraft comprising a wing, a dihydrogen tank and at least one powerplant according to claim 1,
wherein the frame is fastened to the wing, and
wherein the supply pipe is fluidly connected to the dihydrogen tank.

* * * * *